No. 718,927. PATENTED JAN. 20, 1903.
R. H. GOULD.
RECOVERING TIN FROM TIN SCRAP.
APPLICATION FILED AUG. 27, 1900.
NO MODEL.
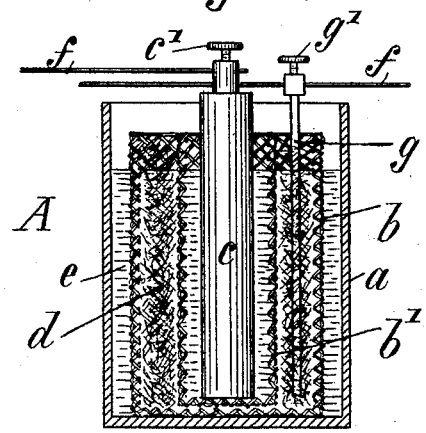
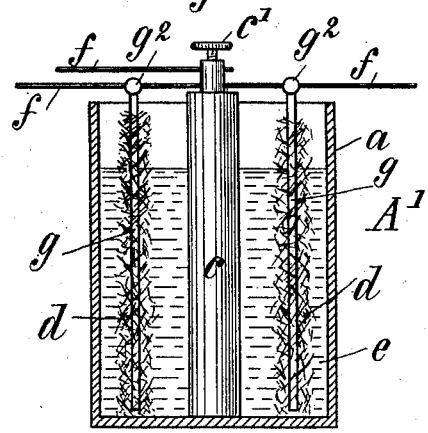
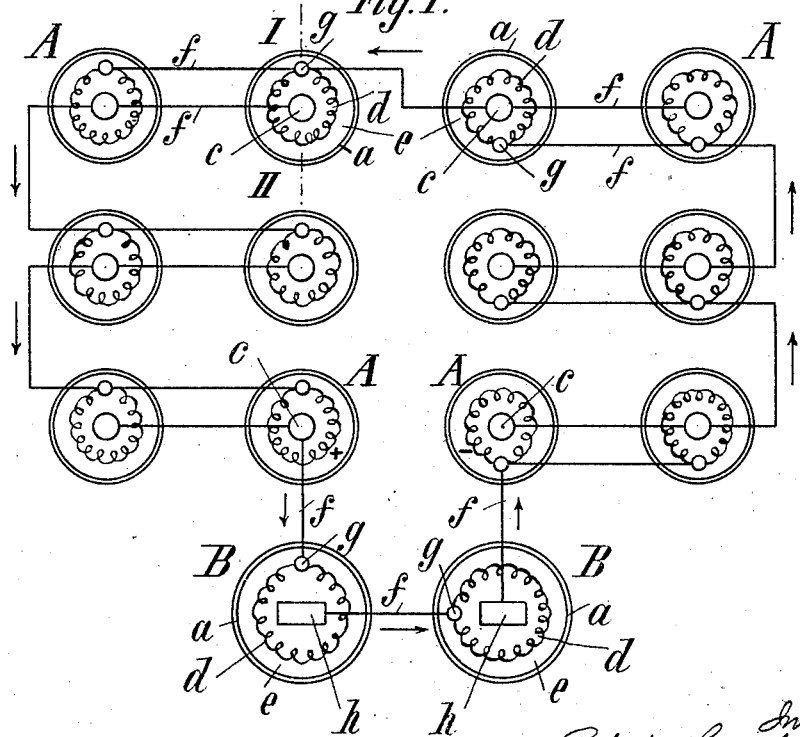

UNITED STATES PATENT OFFICE.

ROBERT HOWE GOULD, OF SURBITON, ENGLAND, ASSIGNOR TO CAESAR GUSTAV LUIS, OF LONDON, ENGLAND.

RECOVERING TIN FROM TIN-SCRAP.

SPECIFICATION forming part of Letters Patent No. 718,927, dated January 20, 1903.

Application filed August 27, 1900. Serial No. 28,185. (No specimens.)

*To all whom it may concern:*

Be it known that I, ROBERT HOWE GOULD, a subject of the Queen of Great Britain, and a resident of Surbiton, county of Surrey, England, have invented a certain new and useful Method of Recovering Tin from Tin Scraps and of Generating Electric Energy, of which the following is a specification.

This invention relates to an improved method of recovering tin from the scraps or clippings made in the manufacture of tinware and of simultaneously generating electric energy.

The methods hitherto employed for recovering tin from tin scraps have proved unreliable and generally unsatisfactory, while the electrolytic method for recovering tin is comparatively expensive, and therefore of little value commercially.

The object of the present invention is to devise a process for the recovery of tin which shall be effective, reliable, simple, and cheap, and this I attain by my improved method or process, which consists in inserting or immersing the tin scraps as anode in the elements of a galvanic battery, each element being formed by a suitable vessel, cask, or the like, a suitable carbon body as cathode, and sea-water or brine as electrolyte, then in subjecting the said tin scraps to the action of such element or elements, and finally in treating the said tin scraps in a separate bath or baths in circuit with the elements of the galvanic battery and made operative by the electric current developed by the latter.

In order that my invention may be more fully understood by those skilled in the art to which it appertains, I shall now proceed to describe the same in detail, reference being had for that purpose to the accompanying sheet of drawings, in which—

Figure 1 is a diagrammatic top view or plan of the complete apparatus or plant and of the several circuits. Fig. 2 is a section on the line I II, Fig. 1, illustrating, on an enlarged scale, the construction of each individual galvanic element; and Fig. 3 is a similar view to Fig. 2, showing a modification of the galvanic element.

Similar letters refer to similar parts throughout the several figures.

Referring to Fig. 2, each individual galvanic element A comprises a suitable vessel, tank, or cask $a$, a wicker basket $b$ placed in the vessel $a$ and containing a second wicker basket $b'$, but of a smaller diameter, a cylinder or block $c$ of carbon or a mixture of carbon with suitable depolarizing means, such as pyrolusite or the like. The tin scraps $d$ to be treated are placed in the annular space between the walls of the baskets $b$ and $b'$. The remaining free space in the vessel $a$ is filled up with sea-water or brine $e$. By this means a cheap galvanic element on a large scale is formed in which the carbon cylinder forms the negative electrode, (cathode,) the tin scraps the positive electrode, (anode,) and the saline solution (sea-water or brine) the exciting fluid or electrolyte.

The conducting-wires $f$ for connecting the electrodes of the element or elements may be attached to the said cathodes in any suitable and well-known manner. The wire $f$ may be fastened to the carbon cylinder $c$—for example, by a clamp-screw $c'$—whereas the connection between the tin-scraps $d$ and the conducting-wire may be established by means of an iron rod $g$, placed in the bulk of the tin scraps and provided with a clamp-screw $g'$ for the said conducting-wire. In some cases, however, I prefer to entirely dispense with the perforated partitions—that is to say, the wicker baskets—and to pile up the tin scraps to be treated around and between a plurality of preferably tinned iron bars $g$, arranged around and some distance apart from the carbon body $c$. (See the modified element A', Fig. 3.) The bars or standards $g$ afford the necessary hold or support to the bulk of tin scraps and form at the same time the conducting and connecting means or terminal to which the conducting-wire $f$ is fastened at $c$. For practical use a greater number of such elements A or A' may be arranged and connected to form a battery.

In the example shown in Fig. 3 the elements A are connected parallel in pairs and such pairs connected in series. In the circuit of the thus-formed battery one or more electrolytic elements B are placed, for a purpose which will be explained hereinafter. The construction and arrangement of these electrolytic elements are quite similar to that of the elements A or A', the only difference being that the carbon electrode c is replaced by a tinned iron plate h.

The tin scraps to be treated are first placed in the elements A, whereupon the battery is set in operation by closing its circuit. The action which takes place in the battery or in each individual element, respectively, is as follows: The iron of the scraps is dissolved and converted into iron chlorids, whereas the tin is only partly dissolved and converted into tin chlorids, while the bulk of the tin is precipitated or deposited in a metallic state upon the cathode c. After a certain time all the tin except a thin film or layer is separated from the scraps. As this thin layer of tin would form an obstacle to the commercial and technical utilization of the iron or scraps, respectively, it is important to remove also this last residue of tin from the iron in order to make the latter pure and marketable. This is effected by means of the above-described electrolytic elements B, into which the scraps after having been treated sufficiently in the elements A are placed. All tin scraps contained in the galvanic elements A of the battery are thus subsequently treated in the electrolytic elements B. The requisite external current for the electrolytic elements B is supplied by the battery itself. A complete continuous process is thus formed in which the electric energy for the second stage—that is to say, for the subsequent treatment and thorough cleansing of the tin scraps—is generated by the tin-separating process in the galvanic elements, which forms the first stage of the improved continuous process.

The chief advantage of my improved process consists in being enabled to separate the tin from the tin scraps on a large scale at a remarkably small cost. The installation and working of a battery on a large scale for the commercial working of the tin-separating process require but comparatively small expense, as the material (tin scraps) to be used and treated is easily obtained and is very cheap.

The exciting fluid or electrolyte to be used costs but little and is also easily obtainable.

The electric energy obtained simultaneously with the recovery of the tin may be conducted away in any convenient manner and utilized for other purposes beside the feeding of the electrolytic elements.

If the poles of a number of such large tin-recovering elements are suitably connected, the excess of electric energy obtained will be considerable and help to cover a large portion of the working expenses.

As an example of the working of this process on a small scale in order to accurately determine the results the following was used. Six cells were constructed as follows: The vessels had an internal capacity of fifteen by fifteen by fifteen centimeters and were each supplied with 2.5 liters of electrolyte of a ten-per-cent. sodium-chlorid solution. The cathodes were hard carbon plates, each twenty by ten centimeters and two centimeters thick, hung from an ordinary glass rod in order to slightly elevate them from the bottom of the vessel to prevent any possibility of short-circuiting. The surface of each cathode covered by electrolyte was three hundred and twenty square centimeters. Two strips of tin twenty centimeters wide and twenty-seven centimeters long were each bent in the middle and these double sheets provided with incisions close together formed the anode, thereby exposing both the iron and the tin surface to the electrolyte. These two double plates were electrically connected and placed one on each side of the cathode and about three or four centimeters from it, there being a surface of twelve hundred and fifty square centimeters of such anode exposed to the action of the electrolyte in each cell. The bath for removing the remainder of the tin from the scrap was a liter of ten-per-cent. sodium-hydrate solution contained in a glass trough eight by fourteen and fourteen centimeters high, so that the electrolyte stood about eleven centimeters deep therein. The cathode was a sheet of tin placed vertically in the middle of the trough, so that fifty-six square centimeters of surface were covered on each side of the sheet to the electrolyte. The anodes were the same as those above described and held together in packs by clamps to expose twelve hundred to fifteen hundred square centimeters surface to the electrolyte. The cells showed after their assemblage a tension of .6 to .7 volts, which was clearly due to the potential difference between iron and carbon and the absence of metallic ions in the electrolyte. During use and after pauses they did not remain constant, but had an average voltage of .5 to .55. That the first voltage drops so rapidly is readily understood when it is remembered that the composition of the electrotyle becomes changed. In the beginning iron almost exclusively and but very little tin goes into solution at the anode. Gradually the electrolyte around the cathode becomes alkaline and the hydrogen set free at the cathode not being dispelled rapidly polarizes the cathode. Later the action is quite otherwise. The iron surfaces become covered with hydroxid and the proportion of tin to iron dissolved is much greater. In the electrolyte there are formed chlorin combinations of both iron and tin and the alkaline electrolyte around the cathode precipitates the iron as hydroxid or oxid. A part of the former is reduced by the hydrogen set free to oxid and falls to the bottom of the cell. Some of the chlorid of tin is converted into stannate and some is reduced to metal by the hydrogen and sodium chlorid is again formed. The tin and iron hydroxid act in this manner as a sort of depolarizer, so that by continued use the voltage does not appreciably decrease. The six cells were connected in series and shortly gave 3.8 volts and after three hours 4.2 volts, but in about ten hours dropped to 1.6 volts. After a rest they gave 2.8, but not higher. After running for eight days each cell only gave .55 volt and remained constant. The internal resistance of a cell was measured after use and found to be very small—.15 to .20 ohm. The electrolyte was quite brown, due to suspended iron hydroxid. The current from these cells was used to separate the tin from the scrap in the above-mentioned device. The tin separated at the cathode in the form of small needles or a sponge. At first there was quite an active evolution of hydrogen, for at the beginning with a high voltage the current is correspondingly great. At this stage, there being no tin ions in the bath, hydrogen must be evolved and even later when the anode does not supply sufficient tin ions, as is the case when the tin has nearly all been removed from the scrap. When the six cells were connected in series, the tension rapidly went down every time from 2.6 immediately to 2.2 volts and from 2.2 volts after about ten hours' use to .64 volt; also, when the cells were connected in parallel in pairs and the three pairs connected in series there was rapid decrease from 1.15 to .9 to .48 volts in the same time. When three cells were connected in parallel and the two groups in series, the results were better. In six hours the voltage fell only from .9 to .8 volt, and when all were connected in parallel the voltage dropped from .5 to .4 volt.

Having thus described my invention, what I claim as new therein, and desire to secure by Letters Patent, is—

1. The method of recovering tin from tin-scrap and generating electric energy, which consists in inserting the tin scraps to be treated in a suitable vessel to form the anode of a galvanic cell, and a cathode or cathodes of a material electropositive to tin and iron in an electrolyte containing an alkaline chlorid, and closing the circuit of said cell, substantially as and for the purpose set forth.

2. The method of recovering tin from tin-scrap and generating electric energy, which consists in first placing the tin-scrap, as anode, in a suitable vessel with a cathode electronegative to tin and a solution of an alkaline chlorid to form a galvanic cell, and then subsequently treating the tin scraps as anode in a similar electrolyte and with a suitable cathode and in circuit with the said galvanic cell, substantially as and for the purpose set forth.

3. The method of recovering tin from tin scraps and generating electric energy, which consists in immersing the tin scraps as anode in a suitable vessel containing sea-water or brine, and a carbon cathode, and closing the circuit between said anode and cathode, substantially as and for the purpose set forth.

4. The method of recovering tin from tin scraps and generating current, which consists in first placing said scraps as anode in a suitable vessel containing sea-water or brine and a carbon cathode, whereby most of the tin is removed, and then placing said scraps as anode in a second vessel containing a similar solution as electrolyte and an iron cathode, passing a current of electricity and depositing tin, substantially as and for the purpose set forth.

5. The method of recovering tin from tin scraps and generating electric energy, which consists in placing the scraps as anode in a suitable vessel containing sea-water or brine and a suitable cathode, thereby recovering most of the tin and generating a current of electricity, subsequently treating the scraps in a similar solution as anode with a tin cathode, and passing the current of electricity derived from scrap undergoing its first treatment, substantially as and for the purpose set forth.

ROBERT HOWE GOULD.

Witnesses:
CAESAR GUSTAV LUIS,
HARRIETT ELLEN LUIS.